(12) United States Patent (10) Patent No.: US 8,477,592 B2
Sutivong et al. (45) Date of Patent: Jul. 2, 2013

(54) INTERFERENCE AND NOISE ESTIMATION IN AN OFDM SYSTEM

(75) Inventors: Arak Sutivong, San Diego, CA (US); Ayman Fawzy Naguib, Cupertino, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 885 days.

(21) Appl. No.: 10/809,538

(22) Filed: Mar. 24, 2004

(65) Prior Publication Data

US 2005/0002324 A1 Jan. 6, 2005

Related U.S. Application Data

(60) Provisional application No. 60/470,724, filed on May 14, 2003.

(51) Int. Cl.
*H04J 11/00* (2006.01)
(52) U.S. Cl.
USPC .......................................................... 370/208
(58) Field of Classification Search
USPC .................. 370/208, 210; 375/260, 267, 347, 375/326
See application file for complete search history.

(56) References Cited

U.S. PATENT DOCUMENTS

| | | | |
|---|---|---|---|
| 2,149,518 A | 3/1939 | Frank, Sr. | |
| 3,470,324 A | 9/1969 | Harmuth | |
| 4,768,023 A | 8/1988 | Xie | |
| 5,280,472 A | 1/1994 | Gilhousen et al. | |
| 5,394,433 A | 2/1995 | Bantz et al. | |
| 5,406,585 A | 4/1995 | Rohani et al. | |
| 5,463,342 A | 10/1995 | Guard et al. | |
| 5,483,557 A | 1/1996 | Webb et al. | |
| 5,490,165 A | 2/1996 | Blakeney, II et al. | |
| 5,535,214 A | 7/1996 | Shiobara | |

(Continued)

FOREIGN PATENT DOCUMENTS

| | | |
|---|---|---|
| CN | 1166094 | 11/1997 |
| CN | 1263675 | 8/2000 |

(Continued)

OTHER PUBLICATIONS

International Preliminary Report on Patentability-PCT/US04/015204, IPEA/US-Apr. 19, 2006.

(Continued)

*Primary Examiner* — Chandrahas Patel
(74) *Attorney, Agent, or Firm* — Donald C. Kordich

(57) ABSTRACT

Noise and interference can be independently measured in a multiple user Orthogonal Frequency Division Multiplexing (OFDM) system. Co-channel interference is measured in a frequency hopping, multiple user, OFDM system by tracking the sub-carriers assigned to all users in a particular service area or cell. The composite noise plus interference can be determined by measuring the amount of received power in a sub-carrier whenever it is not assigned to any user in the cell. A value is stored for each sub-carrier in the system and the value of noise plus interference can be a weighted average of the present value with previously stored values. The noise component can be independently determined in a synchronous system. In the synchronous system, all users in a system may periodically be prohibited from broadcasting over a sub-carrier and the received power in the sub-carrier measured during the period having no broadcasts.

26 Claims, 6 Drawing Sheets

U.S. PATENT DOCUMENTS

| | | | |
|---|---|---|---|
| 5,544,156 A | 8/1996 | Teder et al. |
| 5,553,062 A | 9/1996 | Schilling et al. |
| 5,581,575 A | 12/1996 | Zehavi et al. |
| 5,592,470 A | 1/1997 | Rudrapatna et al. |
| 5,627,938 A | 5/1997 | Johnston et al. |
| 5,647,366 A | 7/1997 | Weng et al. |
| 5,712,869 A | 1/1998 | Lee et al. |
| 5,719,852 A | 2/1998 | Schilling et al. |
| 5,726,978 A | 3/1998 | Frodigh et al. |
| 5,732,391 A | 3/1998 | Fiocca |
| 5,745,480 A | 4/1998 | Behtash et al. |
| 5,752,193 A | 5/1998 | Scholefield et al. |
| 5,754,537 A | 5/1998 | Jamal et al. |
| 5,764,551 A | 6/1998 | McCorkle et al. |
| 5,774,809 A | 6/1998 | Tuutijarvi et al. |
| 5,781,861 A | 7/1998 | Kang et al. |
| 5,809,059 A | 9/1998 | Souissi et al. |
| 5,815,526 A | 9/1998 | Rice et al. |
| 5,857,174 A | 1/1999 | Dugan |
| 5,862,451 A | 1/1999 | Grau et al. |
| 5,864,760 A | 1/1999 | Gilhousen et al. |
| 5,875,214 A | 2/1999 | Urbaniak et al. |
| 5,903,608 A | 5/1999 | Chun et al. |
| 5,914,950 A | 6/1999 | Tiedemann, Jr. et al. |
| 5,920,705 A | 7/1999 | Lyon et al. |
| 5,923,650 A | 7/1999 | Chen et al. |
| 5,938,749 A | 8/1999 | Rusu et al. |
| 5,956,642 A | 9/1999 | Larsson et al. |
| 5,966,377 A | 10/1999 | Murai et al. |
| 5,966,670 A | 10/1999 | Keskitalo et al. |
| 5,969,751 A | 10/1999 | Lee et al. |
| 5,973,642 A | 10/1999 | Li et al. |
| 5,991,271 A | 11/1999 | Jones et al. |
| 5,991,273 A | 11/1999 | Abu-Dayya et al. |
| 6,005,876 A | 12/1999 | Cimini, Jr. et al. |
| 6,014,373 A | 1/2000 | Schilling et al. |
| 6,046,980 A | 4/2000 | Packer |
| 6,049,716 A | 4/2000 | Jung |
| 6,052,594 A | 4/2000 | Chuang et al. |
| 6,061,359 A | 5/2000 | Schilling et al. |
| 6,064,692 A | 5/2000 | Chow et al. |
| 6,085,091 A | 7/2000 | Yoo et al. |
| 6,088,387 A | 7/2000 | Gelblum et al. |
| 6,094,459 A | 7/2000 | Kao et al. |
| 6,101,168 A | 8/2000 | Chen et al. |
| 6,108,374 A | 8/2000 | Balachandran et al. |
| 6,108,384 A | 8/2000 | Okumura et al. |
| 6,111,911 A | 8/2000 | Sanderford, Jr. et al. |
| 6,115,357 A | 9/2000 | Packer et al. |
| 6,128,283 A | 10/2000 | Sabaa et al. |
| 6,128,349 A | 10/2000 | Chow et al. |
| 6,128,882 A | 10/2000 | Jones et al. |
| 6,130,882 A | 10/2000 | Levin et al. |
| 6,131,016 A | 10/2000 | Greenstein et al. |
| 6,134,215 A | 10/2000 | Agrawal et al. |
| 6,134,218 A | 10/2000 | Holden |
| 6,141,388 A | 10/2000 | Servais et al. |
| 6,144,654 A | 11/2000 | Ibanez-Meier et al. |
| 6,151,696 A | 11/2000 | Miller et al. |
| 6,195,552 B1 | 2/2001 | Jeong et al. |
| 6,201,576 B1 | 3/2001 | Raghunath et al. |
| 6,201,954 B1 | 3/2001 | Soliman et al. |
| 6,205,129 B1 | 3/2001 | Esteves et al. |
| 6,208,699 B1 | 3/2001 | Chen et al. |
| 6,208,858 B1 | 3/2001 | Antonio et al. |
| 6,219,374 B1 | 4/2001 | Kim et al. |
| 6,222,875 B1 | 4/2001 | Dahlman et al. |
| 6,222,888 B1 | 4/2001 | Kao et al. |
| 6,230,203 B1 | 5/2001 | Koperda et al. |
| 6,233,455 B1 | 5/2001 | Ramakrishna et al. |
| 6,259,746 B1 | 7/2001 | Levin et al. |
| 6,292,515 B1 | 9/2001 | Kao et al. |
| 6,298,041 B1 | 10/2001 | Packer |
| 6,307,844 B1 | 10/2001 | Tsunehara et al. |
| 6,335,922 B1 | 1/2002 | Tiedemann, Jr. et al. |
| 6,347,080 B2 | 2/2002 | Jou et al. |
| 6,363,255 B1 | 3/2002 | Kuwahara |
| 6,389,056 B1 | 5/2002 | Kanterakis et al. |
| 6,414,988 B1 | 7/2002 | Ling |
| 6,425,105 B1 | 7/2002 | Piirainen et al. |
| 6,426,960 B2 | 7/2002 | Antonio |
| 6,442,130 B1 | 8/2002 | Jones, IV et al. |
| 6,456,653 B1 | 9/2002 | Sayeed |
| 6,483,816 B2 | 11/2002 | Tsunehara et al. |
| 6,490,461 B1 | 12/2002 | Muller et al. |
| 6,496,496 B1 | 12/2002 | Ramakrishna et al. |
| 6,505,058 B1 | 1/2003 | Willey |
| 6,507,585 B1 | 1/2003 | Dobson |
| 6,512,925 B1 | 1/2003 | Chen et al. |
| 6,532,363 B1 | 3/2003 | Pussinen |
| 6,535,723 B1 | 3/2003 | Jiang et al. |
| 6,549,561 B2 * | 4/2003 | Crawford ................ 375/137 |
| 6,563,885 B1 | 5/2003 | Magee et al. ............ 375/316 |
| 6,570,444 B2 | 5/2003 | Wright et al. |
| 6,571,101 B1 | 5/2003 | Schulz |
| 6,571,104 B1 | 5/2003 | Nanda et al. |
| 6,574,205 B1 | 6/2003 | Sato et al. |
| 6,590,879 B1 | 7/2003 | Huang et al. |
| 6,597,913 B2 | 7/2003 | Natarajan |
| 6,609,007 B1 | 8/2003 | Eibling et al. |
| 6,654,609 B2 | 11/2003 | Kim |
| 6,680,925 B2 | 1/2004 | Wu et al. |
| 6,693,892 B1 | 2/2004 | Rinne et al. |
| 6,694,469 B1 | 2/2004 | Jalali et al. |
| 6,701,151 B2 | 3/2004 | Diachina et al. |
| 6,711,208 B2 | 3/2004 | Razoumov et al. |
| 6,741,862 B2 | 5/2004 | Chung et al. |
| 6,744,754 B1 | 6/2004 | Lee et al. |
| 6,751,264 B2 | 6/2004 | Ho et al. |
| 6,751,444 B1 | 6/2004 | Meiyappan et al. |
| 6,757,241 B1 * | 6/2004 | Jones et al. ............. 370/208 |
| 6,760,303 B1 | 7/2004 | Brouwer |
| 6,775,544 B2 * | 8/2004 | Ficarra ................... 455/424 |
| RE38,603 E | 9/2004 | Kim et al. |
| 6,816,827 B1 | 11/2004 | Xia et al. |
| 6,836,666 B2 | 12/2004 | Gopalakrishnan et al. |
| 6,847,826 B1 | 1/2005 | Wesby et al. |
| 6,847,828 B2 | 1/2005 | Miyoshi et al. |
| 6,865,389 B2 | 3/2005 | Lee et al. |
| 6,876,641 B2 | 4/2005 | Banister |
| 6,880,103 B2 | 4/2005 | Kim et al. |
| 6,898,418 B2 | 5/2005 | Rauschmayer et al. |
| 6,904,286 B1 | 6/2005 | Dantu |
| 6,917,581 B2 | 7/2005 | Proctor, Jr. et al. |
| 6,937,582 B1 | 8/2005 | Kronestedt et al. |
| 6,952,561 B1 | 10/2005 | Kumar et al. |
| 6,982,946 B2 | 1/2006 | Wiberg et al. |
| 6,987,798 B2 | 1/2006 | Ahn et al. |
| 6,996,763 B2 | 2/2006 | Sarkar et al. |
| 7,006,429 B2 | 2/2006 | Yoshida et al. |
| 7,012,912 B2 | 3/2006 | Naguib et al. |
| 7,016,651 B1 * | 3/2006 | Narasimhan ............. 455/67.11 |
| 7,031,741 B2 | 4/2006 | Lee et al. |
| 7,047,473 B2 | 5/2006 | Hwang et al. |
| 7,050,406 B2 | 5/2006 | Hsu et al. |
| 7,054,275 B2 | 5/2006 | Kim et al. |
| 7,061,986 B2 | 6/2006 | Tonissen et al. |
| 7,068,702 B2 | 6/2006 | Chen et al. |
| 7,069,038 B2 | 6/2006 | Hakkinen et al. |
| 7,072,315 B1 | 7/2006 | Liu et al. |
| 7,076,001 B2 | 7/2006 | Beadle et al. |
| 7,092,706 B2 | 8/2006 | Yang et al. |
| 7,099,397 B2 | 8/2006 | Lee et al. |
| 7,103,021 B2 | 9/2006 | Jou |
| 7,120,134 B2 | 10/2006 | Tiedemann, Jr. et al. |
| 7,126,928 B2 | 10/2006 | Tiedemann, Jr. et al. |
| 7,126,930 B2 | 10/2006 | Pankaj et al. |
| 7,155,236 B2 | 12/2006 | Chen et al. |
| 7,158,504 B2 | 1/2007 | Kadaba et al. |
| 7,164,669 B2 | 1/2007 | Li et al. |
| 7,177,367 B2 | 2/2007 | Storm et al. |
| 7,187,646 B2 | 3/2007 | Schramm et al. |
| 7,190,964 B2 | 3/2007 | Damnjanovic et al. |
| 7,197,085 B1 * | 3/2007 | Vella-Coleiro ............ 375/296 |
| 7,215,930 B2 | 5/2007 | Malladi et al. |
| 7,245,600 B2 | 7/2007 | Chen |
| 7,257,101 B2 | 8/2007 | Petrus et al. |

| | | |
|---|---|---|
| 7,269,186 B2 | 9/2007 | Abrol et al. |
| 7,269,389 B2 | 9/2007 | Petrus et al. |
| 7,272,199 B2 | 9/2007 | Storm et al. |
| 7,274,743 B2 | 9/2007 | Kim et al. |
| 7,277,709 B2 | 10/2007 | Vadgama |
| 7,280,562 B2 | 10/2007 | Sindhushayana et al. |
| 7,286,558 B2 | 10/2007 | Kim et al. |
| 7,286,846 B2 | 10/2007 | Chen et al. |
| 7,289,529 B2 | 10/2007 | Sherman |
| 7,299,402 B2 | 11/2007 | Soong et al. |
| 7,313,167 B2 | 12/2007 | Yoon et al. |
| 7,315,527 B2 | 1/2008 | Wei et al. |
| 7,317,711 B2 | 1/2008 | Bae et al. |
| 7,327,716 B2 | 2/2008 | Fong et al. |
| 7,336,640 B2 | 2/2008 | McDonough et al. |
| 7,336,954 B2 | 2/2008 | Wang et al. |
| 7,418,064 B2 | 8/2008 | Wei et al. |
| 7,423,992 B2 | 9/2008 | Iwamura et al. |
| 7,447,258 B2 | 11/2008 | Pietila et al. |
| 7,447,287 B1 | 11/2008 | Parantainen |
| 7,463,702 B2 | 12/2008 | Ammer et al. |
| 7,505,780 B2 | 3/2009 | Wei et al. |
| 7,706,403 B2 | 4/2010 | Hosein |
| 8,023,950 B2 | 9/2011 | Malladi et al. |
| 8,150,407 B2 | 4/2012 | Ho et al. |
| 2001/0012271 A1 | 8/2001 | Berger |
| 2001/0019541 A1 | 9/2001 | Jou et al. |
| 2001/0021180 A1 | 9/2001 | Lee et al. |
| 2001/0055287 A1 | 12/2001 | Sawada et al. |
| 2002/0012334 A1 | 1/2002 | Strawczynski et al. |
| 2002/0015388 A1 | 2/2002 | Kim et al. |
| 2002/0018446 A1 | 2/2002 | Huh et al. |
| 2002/0021683 A1 | 2/2002 | Holtzman et al. |
| 2002/0021692 A1 | 2/2002 | Huh et al. |
| 2002/0042283 A1 | 4/2002 | Moulsley |
| 2002/0051432 A1 | 5/2002 | Shin |
| 2002/0057730 A1 | 5/2002 | Karlsson et al. |
| 2002/0067774 A1 | 6/2002 | Razoumov et al. |
| 2002/0089923 A1 | 7/2002 | Yoshida et al. |
| 2002/0093918 A1 | 7/2002 | Kim et al. |
| 2002/0111183 A1 | 8/2002 | Lundby et al. |
| 2002/0131522 A1 | 9/2002 | Felgentreff et al. |
| 2002/0136271 A1 | 9/2002 | Hiramatsu et al. |
| 2002/0137521 A1 | 9/2002 | Kim et al. |
| 2002/0150077 A1 | 10/2002 | Temerinac |
| 2002/0154610 A1 | 10/2002 | Tiedemann, Jr. et al. |
| 2002/0160767 A1 | 10/2002 | Hanly |
| 2002/0167907 A1 | 11/2002 | Sarkar et al. |
| 2002/0172192 A1 | 11/2002 | Hunzinger et al. |
| 2002/0172217 A1 | 11/2002 | Kadaba et al. |
| 2002/0172264 A1 | 11/2002 | Wiberg et al. |
| 2002/0176362 A1 | 11/2002 | Yun et al. |
| 2002/0183039 A1 | 12/2002 | Padgett et al. |
| 2002/0191570 A1 | 12/2002 | Kim et al. |
| 2002/0191677 A1 | 12/2002 | Chen et al. ............ 375/132 |
| 2003/0028251 A1 | 2/2003 | Mathews |
| 2003/0031130 A1 | 2/2003 | Vanghi |
| 2003/0035466 A1 | 2/2003 | Proctor, Jr. et al. |
| 2003/0039317 A1 | 2/2003 | Taylor et al. ............ 375/295 |
| 2003/0050084 A1 | 3/2003 | Damnjanovic et al. |
| 2003/0050086 A1 | 3/2003 | Lee et al. |
| 2003/0058822 A1 | 3/2003 | Jou |
| 2003/0058953 A1 | 3/2003 | Lee et al. ............ 375/260 |
| 2003/0067899 A9 | 4/2003 | Chen et al. |
| 2003/0072392 A1 | 4/2003 | Beadle et al. ............ 375/316 |
| 2003/0073443 A1 | 4/2003 | Bae et al. |
| 2003/0081538 A1 | 5/2003 | Walton et al. ............ 370/206 |
| 2003/0083069 A1 | 5/2003 | Vadgama |
| 2003/0087651 A1 | 5/2003 | Rauschmayer ............ 455/465 |
| 2003/0118086 A1 | 6/2003 | Pietila et al. |
| 2003/0123392 A1 | 7/2003 | Ruutu et al. |
| 2003/0129981 A1 | 7/2003 | Kim |
| 2003/0137953 A1 | 7/2003 | Chae et al. |
| 2003/0142656 A1 | 7/2003 | Padovani et al. |
| 2003/0152102 A1 | 8/2003 | Morgan et al. |
| 2003/0156593 A1 | 8/2003 | McDonough et al. |
| 2003/0161340 A1 | 8/2003 | Sherman |
| 2003/0210735 A1 | 11/2003 | Ahn et al. |
| 2003/0219037 A1 | 11/2003 | Toskala et al. |
| 2004/0001536 A1 | 1/2004 | Lohtia et al. |
| 2004/0013102 A1 | 1/2004 | Fong et al. |
| 2004/0091067 A1 | 5/2004 | Ammer et al. |
| 2004/0101035 A1 | 5/2004 | Boer et al. |
| 2004/0137931 A1 | 7/2004 | Sarkar et al. |
| 2004/0158790 A1 | 8/2004 | Gaal et al. |
| 2004/0160914 A1 | 8/2004 | Sarkar et al. |
| 2004/0160922 A1 | 8/2004 | Nanda et al. |
| 2004/0160933 A1 | 8/2004 | Odenwalder et al. |
| 2004/0162083 A1 | 8/2004 | Chen et al. |
| 2004/0162098 A1 | 8/2004 | Wei et al. |
| 2004/0203973 A1 | 10/2004 | Khan |
| 2004/0208139 A1 | 10/2004 | Iwamura et al. |
| 2004/0224711 A1 | 11/2004 | Panchal et al. |
| 2004/0228288 A1 | 11/2004 | Seol et al. |
| 2004/0228349 A1 | 11/2004 | Vrzic et al. |
| 2004/0228389 A1 | 11/2004 | Odenwalder et al. |
| 2005/0004970 A1 | 1/2005 | Jain et al. |
| 2005/0007986 A1 | 1/2005 | Malladi et al. |
| 2005/0030911 A1 | 2/2005 | Tiedemann et al. |
| 2005/0176456 A1 | 8/2005 | Chen et al. |
| 2005/0254465 A1 | 11/2005 | Lundby et al. |
| 2006/0007892 A1 | 1/2006 | Sudo et al. |
| 2006/0019701 A1 | 1/2006 | Ji |
| 2006/0128410 A1 | 6/2006 | Derryberry et al. |
| 2006/0156166 A1 | 7/2006 | Sarkar et al. |
| 2006/0165126 A1 | 7/2006 | Petersson et al. |
| 2006/0183497 A1 | 8/2006 | Paranchych et al. |
| 2006/0215737 A1 | 9/2006 | Bang et al. |
| 2006/0264220 A1 | 11/2006 | Chen et al. |
| 2007/0030820 A1 | 2/2007 | Sarkar et al. |
| 2007/0111669 A1 | 5/2007 | Malladi et al. |
| 2007/0206623 A1 | 9/2007 | Tiedemann et al. |
| 2008/0043683 A1 | 2/2008 | Kwon et al. |
| 2008/0194286 A1 | 8/2008 | Chen et al. |
| 2009/0052573 A1 | 2/2009 | Tiedemann, Jr. et al. |
| 2009/0083602 A1 | 3/2009 | Sarkar et al. |
| 2010/0135156 A1 | 6/2010 | Sarkar |
| 2010/0309954 A1 | 12/2010 | Odenwalder |
| 2011/0009066 A1 | 1/2011 | Malladi |
| 2013/0022004 A1 | 1/2013 | Chen et al. |

FOREIGN PATENT DOCUMENTS

| | | |
|---|---|---|
| EP | 0627827 A2 | 12/1994 |
| EP | 0771084 A1 | 5/1997 |
| EP | 0783210 A2 | 7/1997 |
| EP | 0809364 A2 | 11/1997 |
| EP | 0912016 A2 | 4/1999 |
| EP | 0921652 A2 | 6/1999 |
| EP | 0996304 A1 | 4/2000 |
| EP | 1104127 | 5/2001 |
| EP | 1168703 A2 | 1/2002 |
| EP | 1231807 A2 | 8/2002 |
| EP | 1236471 A2 | 9/2002 |
| EP | 1248417 A2 | 10/2002 |
| EP | 1257140 A1 | 11/2002 |
| EP | 1292057 A1 | 3/2003 |
| EP | 1326471 | 12/2008 |
| GB | 2301687 A | 12/1996 |
| GB | 2352944 A | 2/2001 |
| JP | 4111553 A | 4/1992 |
| JP | 2001523918 | 4/1992 |
| JP | 6350562 A | 12/1994 |
| JP | 08298498 A | 12/1996 |
| JP | 09312629 | 12/1997 |
| JP | 10013325 A | 1/1998 |
| JP | 11098120 A | 4/1999 |
| JP | 11154919 A | 6/1999 |
| JP | 11196043 | 7/1999 |
| JP | 11508417 T | 7/1999 |
| JP | 2000299680 A | 10/2000 |
| JP | 2000513549 | 10/2000 |
| JP | 2000349740 | 12/2000 |
| JP | 2001016139 A | 1/2001 |
| JP | 2001036500 A | 2/2001 |
| JP | 2001238269 A | 8/2001 |
| JP | 2001515300 T | 9/2001 |
| JP | 2001517017 T | 10/2001 |
| JP | 2002009734 A | 1/2002 |

| | | | |
|---|---|---|---|
| JP | 2002026808 A | 1/2002 | |
| JP | 200277984 | 3/2002 | |
| JP | 2002508137 T | 3/2002 | |
| JP | 2002508896 T | 3/2002 | |
| JP | 2002159061 A | 5/2002 | |
| JP | 2002522988 T | 7/2002 | |
| JP | 2002232943 A | 8/2002 | |
| JP | 2002-531992 | 9/2002 | |
| JP | 2002528954 T | 9/2002 | |
| JP | 2002534020 | 10/2002 | |
| JP | 2002539672 A | 11/2002 | |
| JP | 2003008521 A | 1/2003 | |
| JP | 2003018117 | 1/2003 | |
| JP | 2003032218 | 1/2003 | |
| JP | 2003060606 A | 2/2003 | |
| JP | 2003060609 A | 2/2003 | |
| JP | 2003069523 A | 3/2003 | |
| JP | 2004032518 A | 1/2004 | |
| JP | 2004166038 A | 6/2004 | |
| JP | 2004214746 | 7/2004 | |
| JP | 2004320679 A | 11/2004 | |
| JP | 2005505168 | 2/2005 | |
| JP | 2005505955 | 2/2005 | |
| JP | 2008072733 A | 3/2008 | |
| JP | 4755084 | 6/2011 | |
| JP | 4824556 B2 | 11/2011 | |
| KR | 19960015862 | 11/1996 | |
| KR | 0156478 B1 | 11/1998 | |
| KR | 100214293 | 5/1999 | |
| KR | 20020074739 A | 10/2002 | |
| KR | 20020076991 | 10/2002 | |
| KR | 20020085674 A | 11/2002 | |
| KR | 20020089164 | 11/2002 | |
| KR | 20020092136 | 12/2002 | |
| KR | 100406531 | 11/2003 | |
| RU | 2073913 C1 | 2/1997 | |
| RU | 2111619 C1 | 5/1998 | |
| RU | 2115246 C1 | 7/1998 | |
| RU | 2120198 C1 | 10/1998 | |
| RU | 2149518 C1 | 5/2000 | |
| RU | 2183910 C2 | 6/2002 | |
| RU | 2189696 C2 | 9/2002 | |
| TW | 477129 | 2/2002 | |
| TW | 481963 | 4/2002 | |
| TW | 504914 | 10/2002 | |
| WO | WO9205556 A1 | 4/1992 | |
| WO | WO9507578 | 3/1995 | |
| WO | WO9510144 A1 | 4/1995 | |
| WO | WO9512297 | 5/1995 | |
| WO | WO9701256 A1 | 1/1997 | |
| WO | WO9733399 A1 | 9/1997 | |
| WO | WO9835525 A2 | 8/1998 | |
| WO | WO9836606 A2 | 8/1998 | |
| WO | WO9845966 | 10/1998 | |
| WO | WO9901994 A2 | 1/1999 | |
| WO | WO9904525 | 1/1999 | |
| WO | WO9907089 A1 | 2/1999 | |
| WO | WO9912282 A1 | 3/1999 | |
| WO | 99026371 | 5/1999 | |
| WO | WO9929054 A1 | 6/1999 | |
| WO | WO0008869 A2 | 2/2000 | |
| WO | WO0038368 A1 | 6/2000 | |
| WO | WO0038444 | 6/2000 | |
| WO | WO0042752 A1 | 7/2000 | |
| WO | WO0048328 A1 | 8/2000 | |
| WO | 0054437 | 9/2000 | |
| WO | WO0065743 A1 | 11/2000 | |
| WO | WO0072622 | 11/2000 | |
| WO | WO0106714 | 1/2001 | |
| WO | WO0110159 | 2/2001 | |
| WO | WO0117158 | 3/2001 | |
| WO | WO0124568 | 4/2001 | |
| WO | WO0128127 | 4/2001 | |
| WO | WO0141318 A2 | 6/2001 | |
| WO | 0180477 A1 | 10/2001 | |
| WO | WO0180475 | 10/2001 | |
| WO | WO0199303 A2 | 12/2001 | |
| WO | WO0199312 A1 | 12/2001 | |
| WO | WO0201762 A1 | 1/2002 | |
| WO | WO0223792 A1 | 3/2002 | |
| WO | WO0231991 | 4/2002 | |
| WO | WO0233838 A2 | 4/2002 | |
| WO | 0239595 | 5/2002 | |
| WO | WO0237693 A2 | 5/2002 | |
| WO | WO0237872 A2 | 5/2002 | |
| WO | WO0241531 | 5/2002 | |
| WO | 0245327 | 6/2002 | |
| WO | 0249305 A2 | 6/2002 | |
| WO | WO02060142 A2 | 8/2002 | |
| WO | WO02063818 A1 | 8/2002 | |
| WO | WO02065664 A2 | 8/2002 | |
| WO | WO02080400 A2 | 10/2002 | |
| WO | WO02082108 A1 | 10/2002 | |
| WO | WO02095960 A2 | 11/2002 | |
| WO | WO03003592 | 1/2003 | |
| WO | WO03007530 A2 | 1/2003 | |
| WO | 03028251 A1 | 4/2003 | |
| WO | WO03084163 A1 | 10/2003 | |
| WO | WO2005/015942 | 2/2005 | |

OTHER PUBLICATIONS

International Search Report-PCT/US04/015204, ISA/US-Nov. 8, 2005.
Written Opinion-PCT/US04/015204,-ISA/US-Nov. 8, 2005.
3rd Generation Partnership Project, Technical Specification Group Radio Access Network: 3GPP TS 25.322 V4.7.0; Radio Access Link Control (RLC) Protocol Specification; Release 4, Dec. 2002, pp. 1-76.
Attar et al., "A Reverse Link Outer-Loop Control Algorithm for cma2000 1xEV Systems, " IEEE International Conference on Communications, New York, NY, Apr. 28, 2002, pp. 573-578.
Hamaguchi, et al., "Characteristics of Orthogonal Slow-FH/16QAM method applying Interference-resistant Demodulation," Proceedings of Inst. of Electronics, Information and Communication Engineers, B-II, Jun. 25, 1995, vol. J78, B-II, No. 6, pp. 445-453.
Sarkar S., et al., "Adaptive Control of the Reverse Link in cdma2000", International Journal of Wireless Information Networks, vol. 9, No. 1, pp. 55-70 Jan. 2002.
Sarkar S., et al., "cdma2000 Reverse Link: Design and System Performance", 2000 IEEE, vol. 6, pp. 2713-2719, Sep. 24, 2000.
Sohn et al., "Blind Rate Detection Algorithm in WCDMA Mobile Receiver", IEEE 54th Vehicular Technology Conference Proceedings, Atlantic City, NJ, Oct. 7, 2001, pp. 1589-1592.
Sunay, M. Oguz, et al.: "Provision of Variable Data Rates in Third Generation Wideband DS CDMA Systems," Wireless Communications and Networking Conference, Sep. 21, 1999, pp. 505-509.
Tia Eia interim Standard IS-856-1, 'CDMA2000 High Rate Packet Data Air Interface Specification, Addendum 1, Jan. 2002, pp. 9-23-9-57, XP002299790.
You Y--H, et al.: MC-VSG BNET System for High-Rate Wireless Personal Area Network Applications, IEEE Transactions on Consumer Electronics, IEEE Inc., New York US, vol. 48, No. 2, May 2002, pp. 254-264.
Taiwanese Search report—093103844—TIPO—Oct. 21, 2010.
3GPP2 C.S0024, Version 2.0: "cdma2000 High Rate Packet Data Air Interface Specification," pp. 1-441 (Oct. 27, 2000).
Adachi, F. et al: "Wideband Multi-rate DS-CDMA for Next Generation Mobile Communications Systems", Wireless Communications Conference (1997). Boulder, CO, USA Aug. 11-13, 1997, New York, NY, USA, IEEE, US, Aug. 11, 1997, pp. 57-62, XP010245557, DOI: DOI:10.1109/WCC.1997.622247, ISBN: 978-0-7803-41 94-4.
ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).
European Search Report—EP10172964 ‚Search Authority—Berlin Patent Office, Sep. 28, 2010.
Fujii, T. et al., "Best Effort Cell Structure Using Sub-carrier Selected MC-CDMA System," The Institute of Electronics, Information and Communication Engineers, Nov. 15, 2002, vol. 102, No. 465, pp. 65-72, IEICE Technical Report RCS 2002-203 (English Abstract).

Schreiber, W. F: "Spread-Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.
Taiwanese Search report—093113587—TIPO—Aug. 22, 2010.
3G TS 25.211 "Pnysical channels and mapping of transport channels onto physical channels (FDD)", Release 5, V5.0.0, Mar. 2002.
3G TS 25.212 "Multiplexing and channel coding (FDD)", Release 5, V5.0.0, Mar. 2002.
3G TS 25.213 "Spreading and modulation (FDD)", Release 5, V5.0.0, Mar. 2002.
3G TS 25.214 "Physical layer procedures (FDD)", Release 5, V5.0.0, Mar. 2002.
3GPP2 C.S0024: "cdma2000 High Rate Packet Data Air Interface Specification" 3GPP Standards, Sep. 12, 2000, XP002206456.
Chakravarty S et al: "An Algorithm for Reverse Traffic Channel Rate Control for cdma2000 High Rate Packet Data Systems" IEEE Global Telecommunications Conferenc, 2001. Globecom 01. E. San Antonio, TX, Nov. 25-29, 2001, IEEEglobal Telecommunications Conference, New York, NY : IEEE, US, vol. 6 of 6, Nov. 25, 2001, pp. 3733-3737, XP002277693.
Gyung-Ho Hwang and Dong-Ho Cho, Distributed Rate Control for Throughput Maximization and QoS Support in WCDMA System, IEEE VTC, U.S. IEEE, Oct. 7, 2001, vol. 3, pp. 1721-1725.
International Preliminary Examination Report—PCT/US04/004791, IPEA Feb. 27, 2005.
International Preliminary Examination Report—PCT/US04/025375, IPEA/US, Jul. 20, 2006.
International Preliminary Examination Report—PCT/US04/04669, International Preliminary Examining Authority IPEA/US May 21, 2008.
International Preliminary Examination Report PCT/US2004/004788, IPEA/US Dec. 22, 2005.
International Preliminary Report on Patentability—PCT/US04/006759, IPEA—US, Jan. 17, 2007.
International Preliminary Report on Patentability—PCT/US04/04668—International Search Authority—IPEA/US—Alexandria, Virginia—Jul. 6, 2006.
International Preliminary Report on Patentability—PCT/US2004/004787, International Search Authority—IPEA/US—Alexandria, Virginia—Apr. 19, 2006.
International Preliminary Report on Patentability PCT/US04/004786, IPEA/US Sep. 29, 2006.
International Preliminary Report on Patentability PCT/US2004/004790, IPEA/US, Oct. 2, 2006.
International Preliminary Report on Patentability PCT/US2004/004792, IPEA/US, Jun. 21, 2006.
International Search Report—PCT/US04/004787, International Search Authority—European Patent Office, Sep. 13, 2004.
International Search Report—PCT/US04/004788, International Search Authority, Sep. 24, 2004.
European Patent Office—Sep. 24, 2004.
International Search Report—PCT/USO4/004791, International Search Authority—European Patent Office, Nov. 18, 2004.
International Search Report—PCT/US04/04669, International Search Authority—European Patent Office—Jul. 27, 2004.
International Search Report, PCT/US04/007015, International Search Authority, European Patent Office, Nov. 16, 2004.
International Search Report, PCT/US04/025375, ISA-EPO Dec. 22, 2004.
International Search Report, PCT/US2004/004790 International Search Authority European Patent Office Mar. 7, 2005.
International Search Report, PCT/US2004/004792 International Search Authority European Patent Office Nov. 8, 2004.
International Search Report—PCT/US04/004668, International Search Authority—European Patent Office—Sep. 27, 2004
International Search Report—PCT/US04/004786, International Search Authority—European Patent Office Feb. 14, 2005.
International Search Report—PCT/US04/006759, International Search Authority—European Patent Office—Nov. 5, 2004.
"Mobile Station-Base Station Compatibility Standard for Wideband Spread Spectrum Cellular Systems," TIA/EIA Interim Standard, Feb. 3, 1999, XP002145331, pp. 6-380,6 (TIA/EIA-95-B).

Nadagopal T., et al., "Service Differentiation Through End-To-End Rate Control in Low Bandwith Wireless Packet Networks," 1999. IEEE International Workshop. San Diego CA USA Nov. 15-17, 1999, Mobile Mutlimedia Communications 1999, 211-220.
"The cdma2000 ITU-R RTT Candidate Submission (0.18)," Telecommunications Industry Association TIA, Jul. 27, 1998, XP002294165, pp. 1-145.
TIA/EIA/IS-856-1;"CDMA2000 High Rate Packet Data Air Interface Specification" Addendum 1 (Jan. 2002).
TIA/EIA-95; "Mobile Station- Base Station Compatibility Standard for Wideband Spread Spectrum Celluar Systems"(Mar. 1999).
TIA/EIA-IS-2000 Release C, May 2002. (6-Part document).
"Universal Mobile Telecommunications System (UMTS); Physical channels and mapping of transport channels onto physical channels (FDD) (3GPP TS 25.211 version 5.3.0 Release 5)", ETSI TS 125 211 v 5.3.0, Dec. 2002, pp. 1-52.
Written Opinion—PCT/US04/004791, International Search Authority—European Patent Office, Nov. 18, 2004.
Written Opinion—PCT/US04/006759, International Search Authority—European Patent Office, Nov. 5, 2004.
Written Opinion—PCT/US04/025375, International Search Authority—European Patent Office, Dec. 22, 2004.
Written Opinion—PCT/US2004/004787, International Search Authority—European Patent Office—Sep. 13, 2004.
Written Opinion—PCT/US04/007015, International Searching Authority—European Patent Office, Nov. 16, 2004.
Written Opinion—PCT/US04/004668, International Search Authority—European Patent Office—Sep. 27, 2004.
Written Opinion PCT/US04/004786, International Search Authority European Patent Office Feb. 10, 2005.
Written Opinion PCT/US04/04669 International Search Authority European Patent Office—Jul. 27, 2004.
Written Opinion PCT/US2004/004788, International Search Authority European Patent Office Aug. 15, 2005.
Written Opinion, PCT/US2004/004790 International Search Authority European Patent Office Mar. 7, 2005.
Written Opinion PCT/US2004/004792, International Search Authority European Patent Office Aug. 18, 2005.
Young-Joo Song et al. "Rate-control Snoop : A Reliable Transport Protocol for Heterogeneous Networks with Wired and Wireless Links", IEEE Proceedings 2003, vol. 2, Mar. 16, 2003, pp. 1334-1338.
Young-Uk Chung et al, "An Efficient Reverse Link Data Rate Control Scheme for 1xEV-DV System," IEEE 54th. Vehnicular Technology Conference Proceedings. Atlantic City, NJ, Oct. 7-11, 2001. IEEE, US. vol. 1 of 4, Conf. 54, Oct. 10, 2001, pp. 820-823.
Sklar, "Digital Communications, Fundamentals and Applications", 4 pages, 2001, Prentice-Hall PTR, Upper Saddle River, New Jersey, USA.
Chen, Tau, "Method and Apparatus for Forward Link Power Control During Soft Handoff in a Communication System", U.S. Appl. No. 60/356,929 entitled, filed Feb. 12, 2002, QUALCOMM Incorporated.
Supplementary European Search Report—EP04752264—Search Authority—Berlin—Jun. 22, 2011.
Taiwan Search Report—TW093106052—TIPO—Mar. 28, 2011.
Brouwer A E et al:"An Updated Table of Minimum-Distance Bounds for Binary Linear Codes" IEEE Transactions on Information Theory, IEEE Service Center, Piscataway, NJ, US, vol.39, No. 2, Mar. 1, 1993 pp. 662-677, XP000377724 ISSN: 0018-9448.
MacWilliams F. J.; Sloane N.J.A.:"The Theory of Error-Correcting Codes, pp. 23, 24" 1977, North-Holland, Amsterdam, XP002366024.
Morelos-Zaragoza R. H.: "The Art of Error Correcting Coding, pp. 101-120" 2002, John Wiley and Sons, New York, XP002366026. cited by other.
Morelos-Zaragoza R.H.: "The Art of Error Correcting Coding, pp. 16, 35" 2002, John Wiley and Sons, New York, XP002366025.
Strawczynski et al. "Multi User Frame Structure for 1XEV Forward Link," 3GPP2 cdma2000 TSG-C, Nortel Networks, 2000, pp. 1-6.
Balasubramanian S. et al., "QoS support for Enhanced Reverse Link-Control and Feedback", 3GPP2-Drafts, 2500 Wilson Boulevard, Suite 300, Arlington, Virginia 22201 USA, [Online] Sep. 15, 2003, pp. 1-18, XP040345576, Retrieved from the Internet: URL:http:l/ftp.3gpp2.org/TSGC/working/2003/2003-09-Calagry/TSGC-0309 Calgary/WG3/[retrieved on Sep. 18, 2012).

Soong, A., "Reverse Link enhancements for CDMA2000 IX Revision D (E-REX) R1 ", 3GPP2-Drafts, 2500 Wilson Boulevard, SUITE300, Arlington, Virginia 22201 USA, [Online] Feb. 17, 2003, pp. 1-14, XP040264591, Retrieved from the Internet:URL:http://ftp.3gpp2.org/TSGC/working/2003/2003-02-LosAngelas/TSG-C-2003-02-LA/WG3/[retrieved on Sep. 18, 2012].

Wei Y., et al., "Qualcomm's Interpretation of the MAC Logic for the Harmonized Control Mechanism", 3GPP2-Drafts, 2500 Wilson Boulevard, Suite 300, Arlington, Virginia 22201 USA, [Online] Aug. 18, 2003, pp. 1-9, XP040264988, Retrieved from the Internet: URL:http://ftp.3gpp2.org/TSGC/working/2003/2003-08-Seoui/TSG-C-2003-08-Seoui/WG3/C30-20030818-067-Detailed%20Control%20Mechanism.pdf[retrieved on Sep. 18, 2012].

Yoon Y.C., et al.,"Reverse Link Enhancements for CDMA2000 lX Revision D (E-REX) R2", 3GPP2-Drafts, 2500 Wilson Boulevard, Suite 300, Arlington, Virginia 22201 USA, Aug. 18, 2003, pp. 1-38, XP040264985, Retrieved from the Internet: URL:http://ftp.3gpp2.org/TSGC/working/2003/2003-08-Seoul/TSGC-2003-08-Seoui/WG3/C30-20030818-012%20 E-REX%02011%20writeup.pdf [retrieved on Sep. 18, 2012].

* cited by examiner

INTERFERENCE AND NOISE ESTIMATION IN AN OFDM SYSTEM

CROSS-REFERENCE TO RELATED APPLICATION

This application claims priority to U.S. Provisional Patent Application Ser. No. 60/470,724, filed May 14, 2003, which is incorporated herein by reference in its entirety.

BACKGROUND OF THE INVENTION

1. Field of the Invention

The invention relates to the field of wireless communications. More particularly, the invention relates to systems and methods for estimating noise in an Orthogonal Frequency Division Multiplexing (OFDM) system.

2. Description of the Related Art

Wireless communication systems are continually relied upon to transmit enormous amounts of data in a variety of operating conditions. The amount of frequency spectrum, or bandwidth, that is allocated to a communication system is often limited by government regulations. Thus, there is a constant need to optimize data throughput in a given communication bandwidth.

The problem of optimizing data throughput in a given communication band is compounded by the need to simultaneously support multiple users. The users may each have different communication needs. One user may be transmitting low rate signals, such as voice signals, while another user may be transmitting high rate data signals, such as video. A communication system can implement a particular method of efficiently utilizing a communication band to support multiple users.

Wireless communication systems can be implemented in many different ways. For example, Frequency Division Multiple Access (FDMA), Time Division Multiple Access (TDMA), Code Division Multiple Access (CDMA), and Orthogonal Frequency Division Multiplexing (OFDM) are used in wireless communication systems. Each of the different communication systems has advantages and disadvantages related to particular system aspects.

FIG. 1 is a frequency-time representation of signals in a typical OFDM system. The OFDM system has an allocated frequency spectrum 120. The allocated frequency spectrum 120 is divided into multiple carriers, for example 130a-130d and 132a-132d. The multiple carriers in an OFDM system may also be referred to as sub-carriers. Each of the sub-carriers, for example 130a, is modulated with a low rate data stream. Additionally, as the system name implies, each of the sub-carriers, for example 130a, is orthogonal to all of the other sub-carriers, for example 130b-130d and 132a-132d.

The sub-carriers, for example 130a-130d, can be constructed to be orthogonal to one another by gating the sub-carrier on and off. A sub-carrier, for example 130a, gated on and off using a rectangular window produces a frequency spectrum having a $(\sin(x))/x$ shape. The rectangular gating period and the frequency spacing of the sub-carriers, for example 130a and 130b, can be chosen such that the spectrum of the modulated first sub-carrier 130a is nulled at the center frequencies of the other sub-carriers, for example 130b-130d.

The OFDM system can be configured to support multiple users by allocating a portion of the sub-carriers to each user. For example, a first user may be allocated a first set of sub-carriers 130a-130d and a second user may be allocated a second set of sub-carriers 132a-132d. The number of sub-carriers allocated to users need not be the same and the sub-carriers do not need to be in a contiguous band.

Thus, in the time domain, a number of OFDM symbols 110a-110n are transmitted, resulting in a frequency spectrum of orthogonal sub-carriers 130a-130d and 132a-132d. Each of the sub-carriers, for example 130a, is independently modulated. One or more sub-carriers 130a-130d may be allocated to an individual communication link. Additionally, the number of sub-carriers assigned to a particular user may change over time.

Thus, OFDM is a promising multiplexing technique for high data rate transmission over wireless channels that can be implemented in wireless communication systems, such as cellular communication systems supporting large numbers of users. However, cellular systems use a frequency reuse concept to enhance the efficiency of spectral utilization. Frequency reuse introduces co-channel interference (CCI), which is a major source of performance degradation in such systems. As discussed above, all users within the same cell or sector of an OFDM system are orthogonal to each other because all of the sub-carriers are orthogonal. Thus, within the same cell or sector, the multiple sub-carriers cause substantially no interference to each other. However, adjacent cells or sectors may use the same frequency space because of frequency reuse. Hence, in an OFDM system, users in different cells or sectors are sources of interference and produce the main source of CCI for adjacent cells or sectors.

It is desirable to be able to determine the level of CCI in an OFDM wireless communication receiver. The level of CCI is needed at the receiver for two main reasons. The receiver may operate in a closed power control loop with a transmitter and needs to know the level of CCI to adjust the power level transmitted on each sub-carrier in order to maintain the signal to interference plus noise ratio (SNIR) required for a certain performance. The receiver also needs an estimate of CCI for Carrier to Interference (C/I) or SINR values that are used in the operation of a channel decoder.

SUMMARY OF THE INVENTION

A method and apparatus for determining a noise estimate in an OFDM system are disclosed. An estimate of the noise can be determined by detecting the received power in an unassigned sub-carrier frequency band. If the unassigned sub-carrier frequency band corresponds to a locally unassigned sub-carrier, the received power represents an estimate of the noise plus interference in the sub-carrier frequency band. If the unassigned sub-carrier frequency band corresponds to a system wide unassigned sub-carrier, the received power represents an estimate of the noise floor in the sub-carrier frequency band.

In one aspect, the invention is a method of determining a noise estimate comprising receiving OFDM symbols and detecting a received power in an unassigned sub-carrier frequency band. In another aspect, the invention is a method of determining a noise estimate comprising receiving OFDM symbols in a wireless cellular communication system, where the symbols correspond to a symbol period. The method includes determining unassigned sub-carriers during the symbol period and determining a received power of signals in the unassigned sub-carrier frequency bands. The power is stored in memory and averaged with previously stored values to generate a noise estimate.

In another aspect, the invention is an apparatus for estimating noise in an OFDM system. The apparatus includes a receiver configured to wirelessly receive OFDM symbols and a detector configured to detect the received power level of signals received by the receiver. A processor is included in the apparatus to determine unassigned sub-carriers in a symbol period and to determine a noise estimate based at least in part one the received power levels.

BRIEF DESCRIPTION OF THE DRAWINGS

The above-described aspects and other aspects, features and advantages of the invention will be apparent upon review of the following detailed description and the accompanying drawings. In the drawings, like reference characters identify identical or functionally equivalent elements.

DETAILED DESCRIPTION OF THE PREFERRED EMBODIMENT

Figure 1:
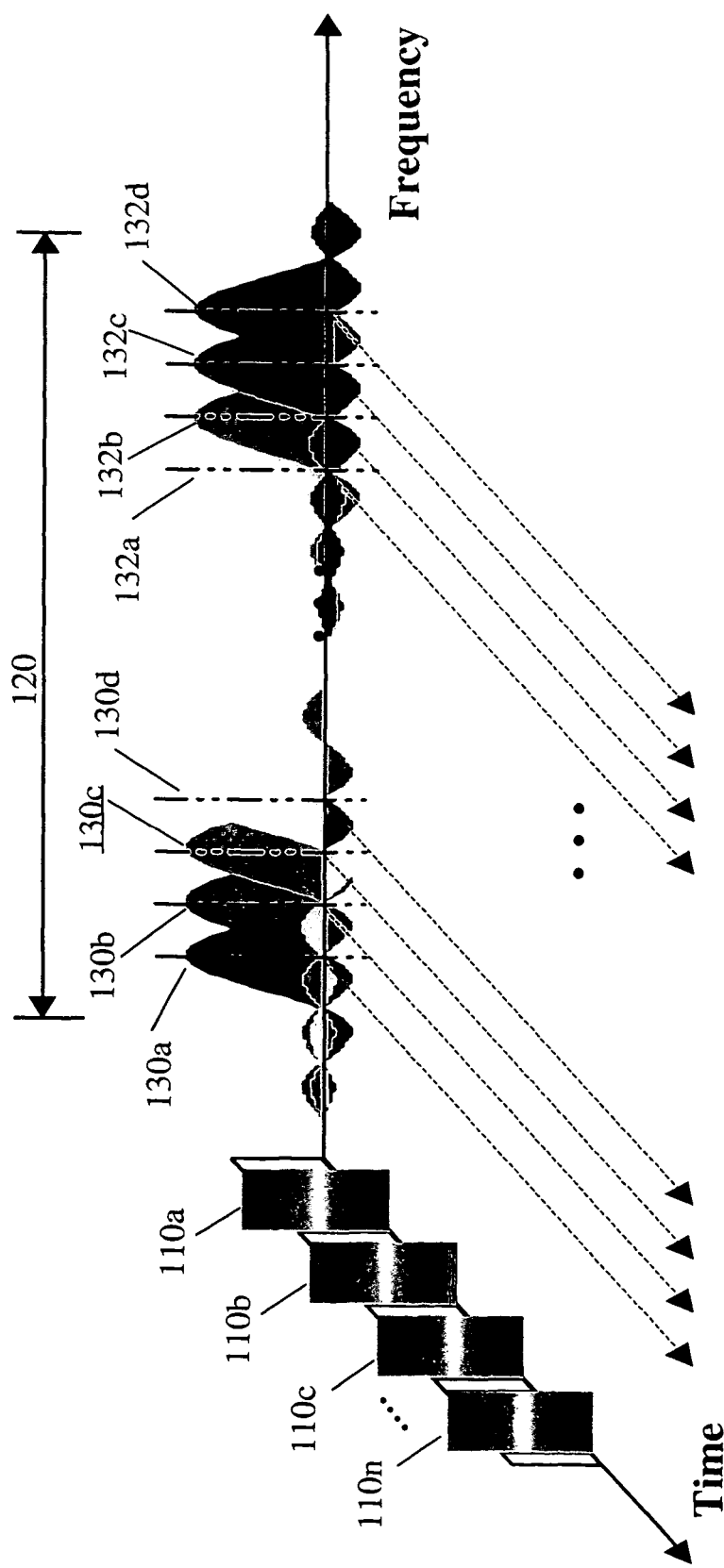
FIG. 1 is a functional frequency-time representation of a typical OFDM system.
Figure 2:
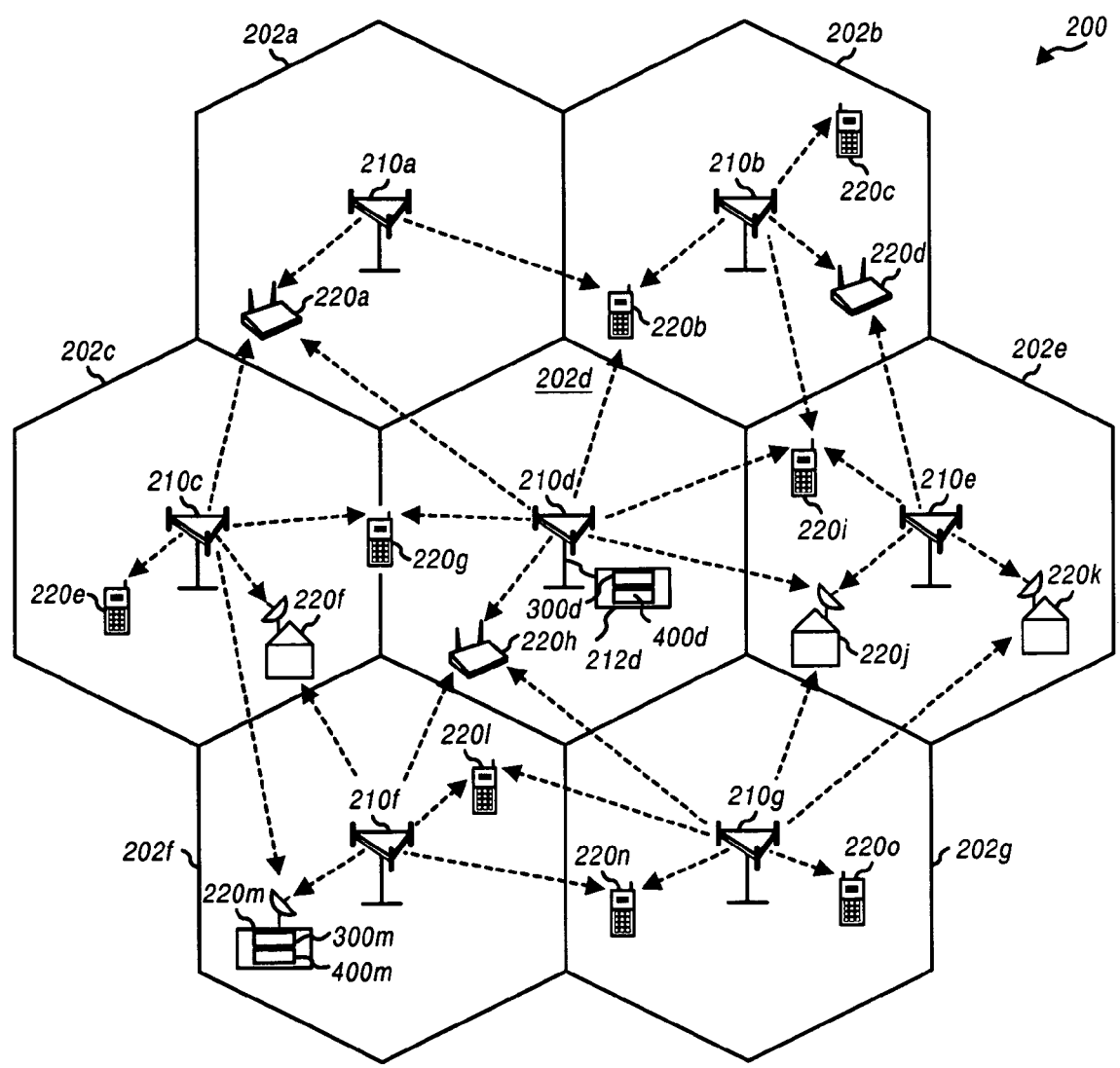
FIG. 2 is a functional block diagram of an OFDM system implemented in a cellular environment.

A functional block diagram of a cellular OFDM wireless communication system 200 having receivers that incorporate sub-carrier noise and interference detection is shown in FIG. 2. The OFDM system 200 includes a number of base stations 210a-210g that provide communication for a number of terminals 220a-220o. A base station, for example 210a, can be a fixed station used for communicating with the terminals, for example 220a, and may also be referred to as an access point, a Node B, or some other terminology.

Various terminals 220a-220o may be dispersed throughout the OFDM system 200, and each terminal may be fixed, for example 220k, or mobile, for example 220b. A terminal, for example 220a may also be referred to as a mobile station, a remote station, a user equipment (UE), an access terminal, or some other terminology. Each terminal, for example 220a, may communicate with one or possibly multiple base stations on the downlink and/or uplink at any given moment. Each terminal, for example 220m, may include an OFDM transmitter 300m and an OFDM receiver 400m to enable communications with the one or more base stations. Embodiments of the OFDM transmitter 300m and the OFDM receiver 400m are described in further detail in FIGS. 3 and 4. In FIG. 2, terminals 220a through 220o can receive, for example pilot, signaling, and user-specific data transmissions from base stations 210a through 210g.

Each base station, for example 210a, in the OFDM system 200 provides coverage for a particular geographic area, for example 202a. The coverage area of each base station is typically dependent on various factors (e.g., terrain, obstructions, and so on) but, for simplicity, is often represented by an ideal hexagon as shown in FIG. 2. A base station and/or its coverage area are also often referred to as a "cell", depending on the context in which the term is used.

To increase capacity, the coverage area of each base station, for example 210a, may be partitioned into multiple sectors. If each cell is partitioned into three sectors, then each sector of a sectorized cell is often represented by an ideal 120° wedge that represents one third of the cell. Each sector may be served by a corresponding base transceiver subsystem (BTS), for example 212d. The BTS 212d includes an OFDM transmitter 300d and an OFDM receiver 400d, each of which are described in greater detail in FIGS. 3 and 4. For a sectorized cell, the base station for that cell often includes all of the BTSs that serve the sectors of that cell. The term "sector" is also often used to refer to a BTS and/or its coverage area, depending on the context in which the term is used.

As will be discussed in further detail below, each base station, for example 210a, typically implements a transmitter configured to provide the downlink, also referred to as the forward link, communication to terminals, for example 220a. Additionally, each base station, for example 210a, also implements a receiver configured to receive the uplink, also referred to as reverse link, communication from the terminals, for example 220a.

In the downlink direction, the base station transmitter receives a signal from a signal source, which may be a Public Switched Telephone Network (PSTN) or some other signal source. The base station transmitter then converts the signal to an OFDM signal that is to be transmitted to one or more terminals. The base station transmitter may digitize the signal, multiplex the signal into several parallel signals, and modulate a predetermined number of sub-carriers corresponding to the number of parallel signal paths. The number of sub-carriers may be constant or may change. Additionally, the sub-carriers may be adjacent to one another so as to define a contiguous frequency band or may be disjoint from one another so as to occupy a number of independent frequency bands. The base station may assign sub-carriers in a method that is constant, such as in the case of a fixed number of sub-carriers, pseudo-random, or random. The base station transmitter may also include an analog or Radio Frequency (RF) portion to convert OFDM baseband signals to a desired transmit frequency band.

In an OFDM system 200, frequency reuse may occur in every cell. That is, the up link an down link frequencies used by a first base station, for example 210d, in a first cell, for example 202d, may be used by the base stations, 210a-c and 210e-g, in adjacent cells 202a-c and 202e-g. As described above, each base station transmitter contributes to the co-channel interference (CCI) experienced by neighboring receivers, in this case neighboring terminal receivers. For example, the transmitter in a first base station 210f contributes to the CCI of terminals, 220e and 220g, in adjacent cells 202c and 202d, that are not communicating with the first base station 210f. To help minimize the amount of CCI experienced by neighboring terminals, the base station transmitter can be part of a closed loop power control system.

To help minimize the amount of CCI experienced by terminals outside of a cell, for example 202f, the base station transmitter may minimize the RF power it transmits to each of the terminals, 220m and 220l, with which the base station 210f is in communication. The base station transmitter can adjust the transmit power based in part on a determination of the noise level in each sub-carrier band and on a power control signal transmitted by the terminal and received by a base station receiver.

The base station, for example 210b, can attempt to maintain a predetermined SINR or C/I value for each sub-carrier, such that a predetermined quality of service is maintained to the terminals, for example 220b-d. An SIR or C/I that is greater than the predetermined value may contribute little to the quality of service seen by the terminal, for example 220b, but would result in an increased CCI for all adjacent cells, 202a, 202d, and 202e. Conversely, an SINR or C/I value that is below the predetermined level can result in greatly decreased quality of service experienced by the terminal, 220b.

The base station receiver can measure the noise and interference levels in each of the sub-carrier bands as part of a power control loop that sets a SINR or C/I of the transmit signal. The base station receiver measures the noise and interference levels in each of the sub-carrier bands and stores the levels. As sub-carriers are assigned to communication links, the base station transmitter examines the noise and interference levels in determining the power to allocate to each sub-carrier. Thus, the base station transmitter can maintain a predetermined SINR or C/I for each sub-carrier that minimizes the CCI experienced by terminals in other cells.

In another embodiment, the terminal, for example 220i, can attempt to maintain the minimum received SINR or C/I required for achieving a predetermined quality of service. When the received SINR or C/I is above a predetermined level, the terminal 220i can transmit a signal to the base station 210f to request the base station 210f reduce the transmit signal power. Alternatively, if the received SINR or C/I is below the predetermined level, the terminal 220i can transmit a signal to the base station 210f to request that the base station 210f increase the transmit signal power. Thus, by minimizing the power transmitted to any given terminal, the amount of CCI experienced by terminals in adjacent cells is minimized.

Figure 3:
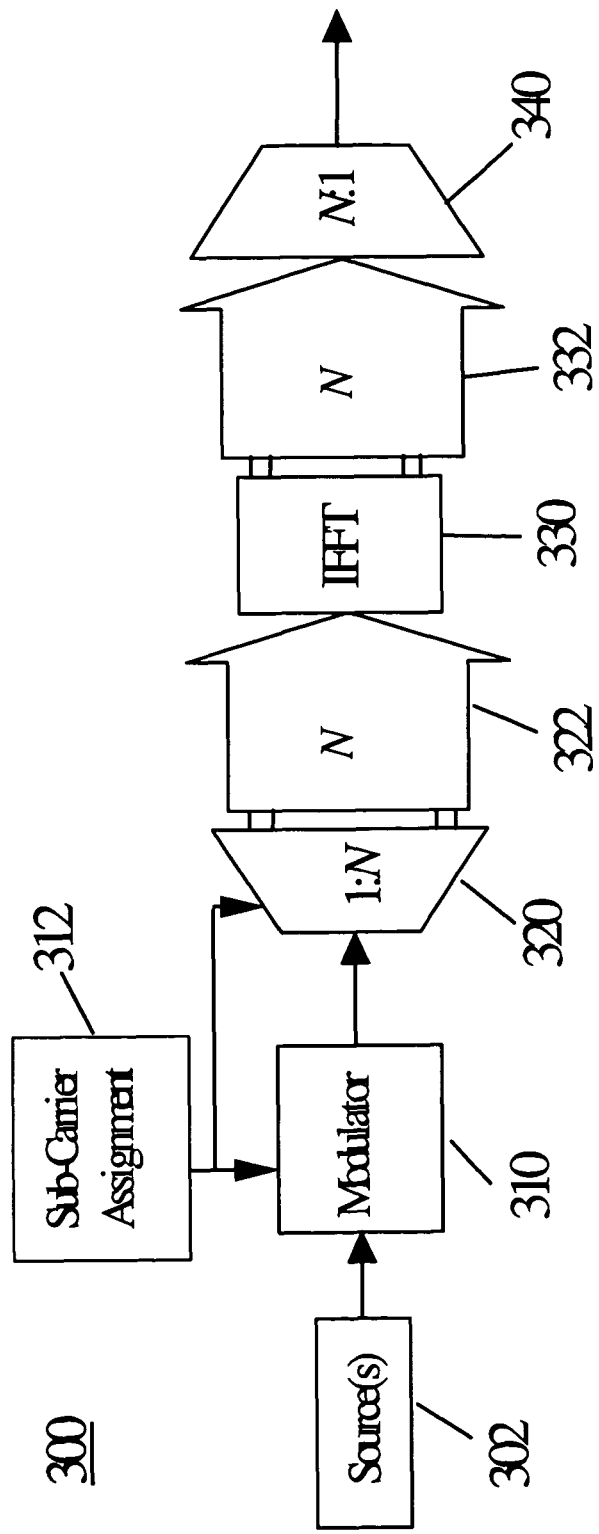
FIG. 3 is a functional block diagram of an OFDM transmitter.

FIG. 3 is a functional block diagram of an OFDM transmitter 300 that may be incorporated, for example in a base transceiver station or a terminal. The functional block diagram of the OFDM transmitter 300 includes the baseband section details the baseband portion of the transmitter and does not show signal processing, source interface, or RF sections that may be included in the transmitter 300.

The OFDM transmitter 300 includes one or more sources 302 that correspond to one or more data streams. When the OFDM transmitter 300 is a base station transmitter, the sources 302 may include data streams from an external network, such as a PSTN network. Each of the data streams may be intended for a separate terminal. The data provided by the sources 302 can be multiple parallel data streams, serial data streams, multiplexed data streams, or a combination of data streams. The sources 302 provides the data to a modulator 310. The modulator 310 processes and modulates the input sources. The modulator 310 can include functional blocks that perform interleaving, encoding, grouping, and modulation, as is known in the art. The modulator 310 is not limited to performing a particular type of interleaving. For example, the modulator can independently block interleave the source data for each terminal.

The modulator 310 can also be configured to perform encoding. Again, the transmitter 300 is not limited to a particular type of encoding. For example, the modulator 310 may perform Reed-Solomon encoding or convolutional encoding. The encoding rate may be fixed or may vary depending on the number of sub-carriers assigned to a communication link to the terminal. For example, the modulator 310 can perform convolutional encoding with a rate one half encoder when a first number of sub-carriers are assigned to a terminal and can be controlled to perform convolutional encoding with a rate of one third when a second number of sub-carriers are assigned to the terminal. In another example, the modulator can perform Reed-Solomon encoding with a rate that varies depending on the number of sub-carriers assigned to the terminal.

The modulator 310 also can be configured to modulate the data using a predetermined format. For example, the modulator 310 can perform Quadrature Amplitude Modulation (QAM), Quadrature Phase Shift Keying (QPSK), Binary Phase Shift Keying (BPSK), or some other modulation format. In another embodiment, the modulator 310 processes the data into a format for modulating the sub-carriers.

The modulator 310 can also include amplifiers or gain stages to adjust the amplitude of the data symbols assigned to the sub-carriers. The modulator 310 may adjust the gain of the amplifiers on a sub-carrier basis, with the gain to each sub-carrier dependent, at least in part, on the noise and interference in the sub-carrier bandwidth.

The output of the modulator 310 is coupled to the input of a 1:N multiplexer 320, where N represents the maximum number of sub-carriers used in the transmit link of the communication system. The multiplexer 320 may also be referred to as a "serial to parallel converter" because the multiplexer 320 receives serial data from the modulator 310 and converts it to a parallel format to interface with the plurality of sub-carriers.

A sub-carrier assignment module 312 controls the modulator 310 and the multiplexer 320. The number of sub-carriers used to support the source data can be, and typically is, less than the maximum number of sub-carriers used in the transmit link of the communication system. The number of sub-carriers assigned to a particular communication link can change over time. Additionally, even if the number of sub-carriers assigned to a particular communication link remains the same, the identity of the sub-carriers can change over time.

Sub-carriers can be randomly, or pseudo-randomly, assigned to communication links. Because the identity of the sub-carriers can change, the frequency bands occupied by the communication link can change over time. The communication system can be a frequency hopping system implementing a predetermined frequency hopping method.

The sub-carrier assignment module 312 can implement the frequency hopping method and can track the set of sub-carriers used and the sets of sub-carriers allocated to communication links. For example, in a base station with three forward link signals, the sub-carrier assignment module 312 may assign a first set of sub-carriers to a first communication link, a second set of sub-carriers to a second communication link, and a third set of sub-carriers to a third communication link. The number of sub-carriers in each set may be the same of may be different. The sub-carrier assignment module 312 tracks the number of sub-carriers allocated to communication links and the number of sub-carriers that are idle and capable of assignment to communication links.

The sub-carrier assignment module 312 controls the modulator 310 to provide the desired encoding, and modulation required supporting the assigned sub-carrier set. Additionally, the sub-carrier assignment module 312 controls the multiplexer 320 such that data from the modulator 310 is provided to the multiplexer channel corresponding to an assigned sub-carrier. Thus, the sub-carrier assignment module 312 controls the identity of and number of sub-carriers assigned to a particular communication link. The sub-carrier assignment module 312 also tracks the identity of sub-carriers that are idle and that can be allocated to a communication link.

The output of the multiplexer 320 is coupled to an Inverse Fast Fourier Transform (IFFT) module 330. A parallel bus 322 having a width equal to or greater than the total number sub-carriers couples the parallel output from the multiplexer 320 to the IFFT module 330.

A Fourier transform performs a mapping from the time domain to the frequency domain. Thus, an inverse Fourier transform performs a mapping from the frequency domain to the time domain. The IFFT module 330 transforms the modulated sub-carriers into a time domain signal. Fourier transform properties ensure that the sub-carrier signals are evenly spaced and are orthogonal to one another.

The parallel output from the IFFT module 330 is coupled to a demultiplexer 340 using another parallel bus 332. The demultiplexer 340 converts the parallel modulated data stream into a serial stream. The output of the demultiplexer 340 may then be coupled to a guard band generator (not shown) and then to a Digital to Analog Converter (DAC) (not shown). The guard band generator inserts a period of time between successive OFDM symbols to minimize effects of inter-symbol interference due to multipath in the communication link. The output of the DAC may then be coupled to an RF transmitter (not shown) that upconverts the OFDM signal to a desired transmit frequency band.

Figure 4A:
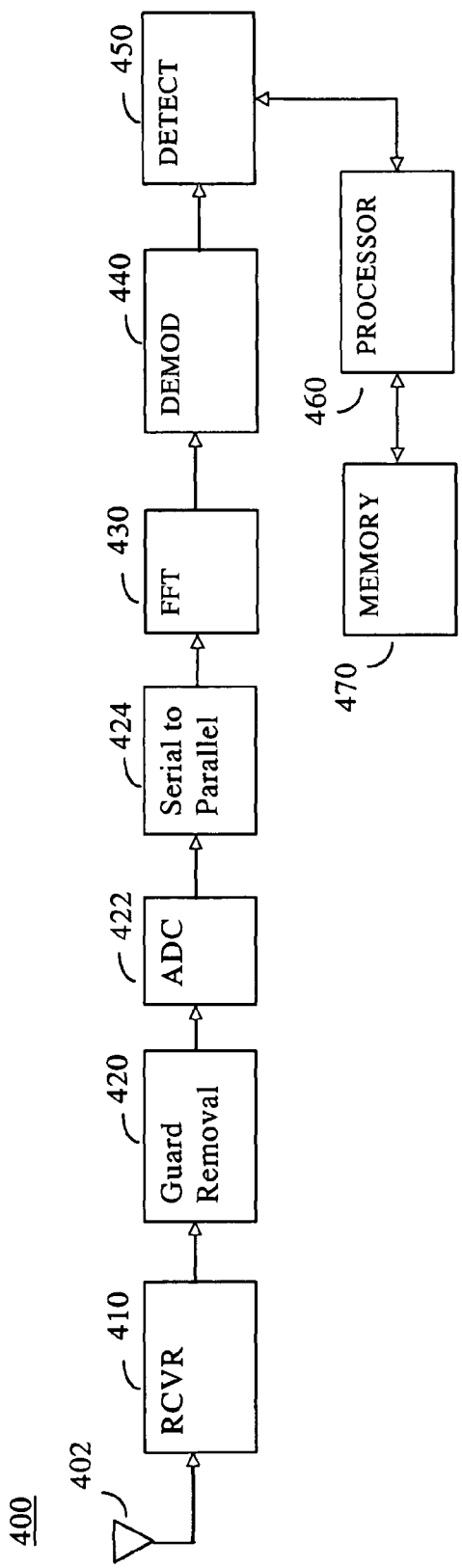
FIGS. 4A-4B are functional block diagrams of OFDM receivers.
Figure 4B:
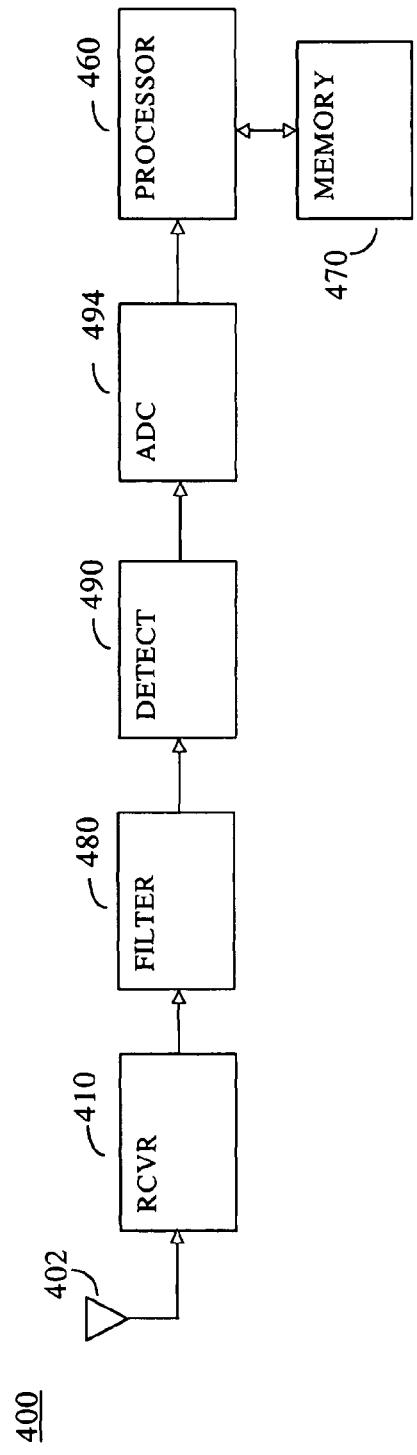

FIGS. 4A-4B are functional block diagrams of OFDM receiver 400 embodiments. The OFDM receiver 400 can be implemented in the base station or in a terminal, such as a mobile terminal. The OFDM receiver 400 of FIG. 4A implements a noise estimator primarily in the digital domain, while the OFDM receiver 400 of FIG. 4B implements a noise estimator primarily in the analog domain.

The OFDM receiver 400 of FIG. 4A receives at an antenna 402 RF signals that are transmitted by a complementary OFDM transmitter. The output of the antenna 402 is coupled to a receiver 410 that can filter, amplify, and downconvert to baseband the received OFDM signal.

The baseband output from the receiver 410 is coupled to a guard removal module 420 that is configured to remove the guard interval inserted between OFDM symbols at the transmitter. The output of the guard removal module 420 is coupled to an Analog to Digital Converter (ADC) 422 that converts the analog baseband signal to a digital representation. The output of the ADC 422 is coupled to a multiplexer 424 that transforms the serial baseband signal into N parallel data paths. The number N represents the total number of OFDM sub-carriers. The symbols in each of the parallel data paths represent the gated time domain symbols of the OFDM signal.

The parallel data paths are coupled to an input of a Fast Fourier Transform (FFT) module 430. The FFT module 430 transforms the gated time domain signals into frequency domain signals. Each of the outputs from the FFT module 430 represents a modulated sub-carrier.

The parallel output from the FFT module 430 is coupled to a demodulator 440 that demodulates the OFDM sub-carriers. The demodulator 440 may be configured to demodulate only a subset of the sub-carriers received by the receiver 400 or may be configured to demodulate all of the outputs from the FFT module 430, corresponding to all of the sub-carriers. The demodulator 440 output can be a single symbol or can be a plurality of symbols. For example, if the sub-carrier is quadrature modulated, the demodulator 440 can output in-phase and quadrature signal components of the demodulated symbol.

The output of the demodulator 440 is coupled to a detector 450. The detector 450 is configured to detect the received power in each of the sub-carrier frequency bands. The detector 450 can detect the received power by detecting or otherwise determining, for example, a power, an amplitude, a magnitude squared, a magnitude, and the like, or some other representation of the demodulated sub-carrier signal that correlates with received power. For example, a magnitude squared of a quadrature modulated signal can be determined by summing the squares of the in-phase and quadrature signal components. The detector 450 can include a plurality of detectors or can include a single detector that determines the detected value of desired sub-carrier signals prior to the occurrence of the next demodulated symbol.

A processor 460 interfaces with memory 470 that includes processor readable instructions. The memory 470 can also includes rewriteable storage locations that are used to store and update the detected sub-carrier noise values.

The sub-carriers allocated to a particular communication link may change at each symbol boundary. A frequency hopping sequence or frequency hopping information that identifies the sub-carriers allocated to the communication link to the receiver 400 can also be stored in memory 470. The processor 460 uses the frequency hopping information to optimize performance of the FFT module 430, the demodulator 440, and the detector 450. Thus, the processor 460 is able to use the frequency hopping sequence, or other frequency hopping information, to identify which of the sub-carriers are allocated to a communication link and which of the sub-carriers are idle.

For example, where less than the total number of sub-carriers is allocated to the communication link to the receiver 400, the processor 460 can control the FFT module 430 to determine only those FFT output signals that correspond to the allocated sub-carriers. In another embodiment, the processor 460 controls the FFT module 430 to determine the output signals corresponding to the sub-carriers allocated to the communication link to the receiver 400 plus the outputs corresponding to sub-carriers that are idle and not allocated to any communication link. The processor 460 is able to relieve some of the load on the FFT module 430 by decreasing the number of FFT output signals it needs to determine.

The processor 460 may also control the demodulator 440 to only demodulate those signals for which the FFT module 430 provides an output signal. Additionally, the processor 460 may control the detector 450 to detect only those sub-carrier signals that correspond to idle, or unallocated sub-carriers. Because the detector 450 can be limited to detecting noise levels in unallocated sub-carriers, the detector 450 can be configured to detect the signals prior to the demodulator. However, placing the detector 450 after the demodulator 440 may be advantageous because the noise detected by the detector 450 will have experienced the same signal processing experienced by symbols in that sub-carrier. Thus, the statistical properties of the signal processing experienced by the demodulated noise will be similar to the statistical properties experienced by the demodulated symbols.

The processor 460 can track the noise in the sub-carriers by detecting the power of the demodulated noise in a sub-carrier whenever the sub-carrier is not assigned to a communication link. The detected power of the unassigned sub-carrier represents the power of interference plus noise in that sub-carrier band. The processor can store the detected power in a memory location in memory 470 corresponding to the sub-carrier. In a frequency hopping OFDM system, the identity of unassigned sub-carriers changes over time, and may change at each symbol boundary.

The processor 460 can store a number of detected power measurements for a first sub-carrier in independent memory locations. The processor 460 can then average a predetermined number of detected power measurements. Alternatively, the processor 460 can compute a weighted average of the noise and interference by weighting each of the stored detected power measurements by a factor that depends, in part, on the age of the detected power measurement. In still another embodiment, the processor 460 can store the detected noise and interference power in a corresponding location in memory 470. The processor 460 may then update the noise and interference value for a particular sub-carrier by weighting the stored value by a first amount and weighting a new detected power by as second amount and storing the sum in the memory location corresponding to the sub-carrier. Using this alternative update method, only N storage locations are required to store the N sub-carrier noise and interference estimates. It may be seen that other methods of storing and updating the noise and interference values for the sub-carriers are available.

The detected power for an unassigned sub-carrier represents the aggregate noise and interference for that sub-carrier band unless no interfering sources are broadcasting in the frequency band. When no interfering sources are broadcasting in the sub-carrier frequency band, the detected power represents the detected power of the noise floor.

An OFDM system may guarantee that no system sources are broadcasting an interfering signal in a sub-carrier band by synchronizing all transmitters and defining a period during which all of the transmitters do not transmit over a particular sub-carrier. That is, where the noise estimator is performed in a receiver at the terminal, all base stations in an OFDM system may periodically stop transmitting on one or more predetermined sub-carrier frequencies during a predetermined symbol period. Communication in the OFDM system does not cease during the period in which the single sub-carrier is unassigned because all other sub-carriers may continue to be allocated to communication links. Thus, the level of noise without interference may be determined for each of the sub-carrier frequency bands by synchronizing the transmitters and periodically not assigning each of the sub-carriers to any communication link for one or more symbol periods. Then, the noise power with no interfering sources can be determined for the sub-carrier band during the period of non-assignment.

FIG. 4B is a functional block diagram of another embodiment of an OFDM receiver 400 in which the noise and interference are detected using analog devices. The receiver 400 initially receives OFDM signals at an antenna 402 and couples the output of the antenna 402 to a receiver 410. As in the previous embodiment, the receiver 410 filters, amplifies, and downconverts to baseband the received OFDM signal. The output of the receiver 410 is coupled to the input of a filter 480. The baseband output of the receiver 410 may also be coupled to other signal processing stages (not shown), such as a guard removal module, a FFT module, and a demodulator.

In one embodiment, the filter 480 is a filter bank having a number of baseband filters equal to a number of sub-carriers in the communication system.

Each of the filters can be configured to have substantially the same bandwidth as the signal bandwidth of the sub-carrier. In another embodiment, the filter 480 is a filter bank having one or more tunable filters that can be tuned to any sub-carrier band in the communication system. The tunable filters are tuned to the sub-carrier frequency bands that are not allocated to the communication link to the receiver 400. The bandwidth of the tunable filters can be substantially the same as the bandwidth of the sub-carrier band.

The output from the filter 480 is coupled to the detector 490. The output from the filter 480 may be one or more filtered signals. The number of output signals from the filter 480 may be as high as the number of sub-carriers in the communication system.

The detector 490 can be configured to detect the power in each of the filtered signals. The detector 490 can include one or more power detectors. The power detectors can correspond to an output of the filter 480. Alternatively, one or more power detectors can be used to successively detect the power from each of the filter outputs.

The output of the detector 490 is coupled to the input of an ADC 494. The ADC 494 can include a plurality of converters, each corresponding to a one of the detector 490 outputs. Alternatively, the ADC 494 can include a single ADC that is sequentially converts each of the detector 490 outputs.

A processor 460 interfacing with a memory 470 can be coupled to the output of the ADC 494. The processor 460 can be configured, using processor readable instructions stored in memory 470, to control the ADC 494 to convert only those detected power levels of interest. Additionally, the processor 460 can track the frequency hopping sequence and update the detected noise and interference levels as in the previous embodiment. The noise level can be detected independent of the interference level in synchronous systems where all transmitters can be controlled to periodically cease transmitting on a predetermined sub-carrier for a predetermined duration, such as a symbol period.

Figure 5:
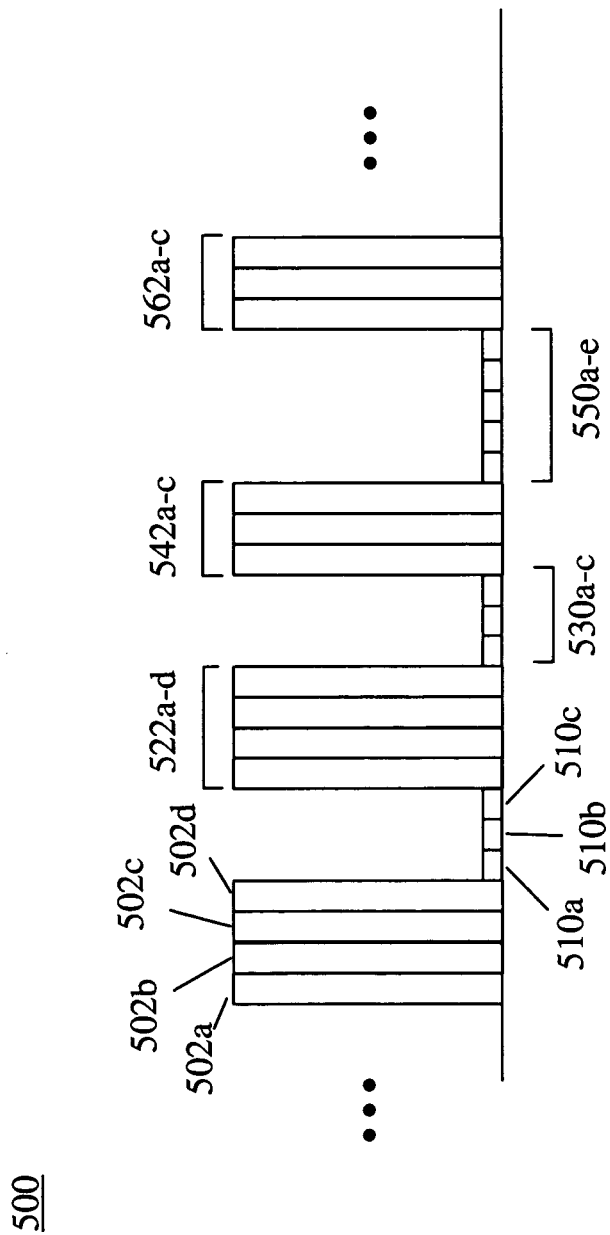
FIG. 5 is a spectrum diagram of a portion of an OFDM frequency band.

FIG. 5 is a spectrum diagram of a portion of an OFDM frequency band 500 during a predetermined period of time. The OFDM frequency band 500 includes a number of sub-carriers that each occupy a predetermined frequency band, for example 502a. A plurality of communication links may simultaneously occupy the OFDM frequency band 500. The plurality of communication links may use only a subset of the total number of sub-carriers available in the system.

For example, a first communication link may be allocated four sub-carriers occupying four frequency bands, 502a-d. The sub-carriers and the corresponding frequency bands 502a-d are shown as positioned in one contiguous frequency band. However, the sub-carriers allocated to a particular communication link do not need to be adjacent and may be any of the available sub-carriers in the OFDM system. A second communication link may be allocated a second set of sub-carriers, and thus a second set of sub-carrier frequency bands 522a-d. Similarly a third and a fourth communication link may be allocated a third set and a fourth set, respectively, of sub-carriers. The third set of sub-carriers corresponds to a third set of frequency bands 542a-c and the fourth set of sub-carriers corresponds to a fourth set of sub-carrier frequency bands 562a-c.

The number of sub-carriers allocated to a particular communication link may vary with time and may vary according to the loads placed on the communication link. Thus, higher data rate communication links may be allocated a higher number of sub-carriers. The number of sub-carriers allocated to a communication link may change at each symbol boundary. Thus, the number and position of sub-carriers allocated in the OFDM system may change at each symbol boundary.

Because the total number of allocated sub-carriers may not correspond to the total number of sub-carriers available in the OFDM system, there may be one or more sub-carriers that are not allocated to any communication link, and thus are idle. For example, three sub-carrier bands, 510a-c, 530a-c, and 550a-e, are shown in the OFDM frequency band 500 as not allocated to any communication link. Again, the unassigned sub-carriers, and thus the corresponding sub-carrier bands, need not be adjacent and do not necessarily occur between allocated sub-carriers. For example, some or all of the unassigned sub-carriers may occur at one end of the frequency band.

A receiver can estimate, and update estimates of, the noise plus interference in a sub-carrier by detecting the power in the sub-carrier band when the sub-carrier is unassigned. An unassigned sub-carrier can represent a sub-carrier that is locally unassigned, such as in a cell or sector in which the receiver is positioned. Other cells or sectors of a cell may allocate the sub-carrier to a communication link.

For example, a first receiver, such as a receiver in a terminal may establish a communication link with a base station using a first set of sub-carriers in a first frequency band 502a-d. The first receiver can estimate the noise and interference in an unassigned frequency band, for example 530a, by determining the power in the sub-carrier frequency band 530a. As discussed earlier, the receiver may update an estimate previously stored in memory by averaging previously stored power levels with the most recently measured power level. Alternatively, the most recently determined power level, corresponding to the most recent noise and interference estimate, may be used in the determination of a weighted average of a predetermined number of recent noise plus interference estimates.

Additionally, in a synchronized system, one or more of the sub-carriers may be unassigned for all transmitters for a predetermined duration, for example one symbol duration. Thus, the sub-carrier is unassigned in all cells of a particular OFDM system for the symbol duration. Then for the system wide unassigned sub-carrier the receiver can estimate the noise floor by determining the power in the sub-carrier frequency band, for example 550d, during the period in which no transmitter is transmitting in the frequency band. The receiver may also update the noise estimates by averaging or weighted averaging a number of estimates. The receiver may separately store the estimate of the noise floor for each of the sub-carrier bands. Thus, the receiver is periodically able to update the noise floor and noise and interference levels in each of the sub-carrier bands.

Figure 6:
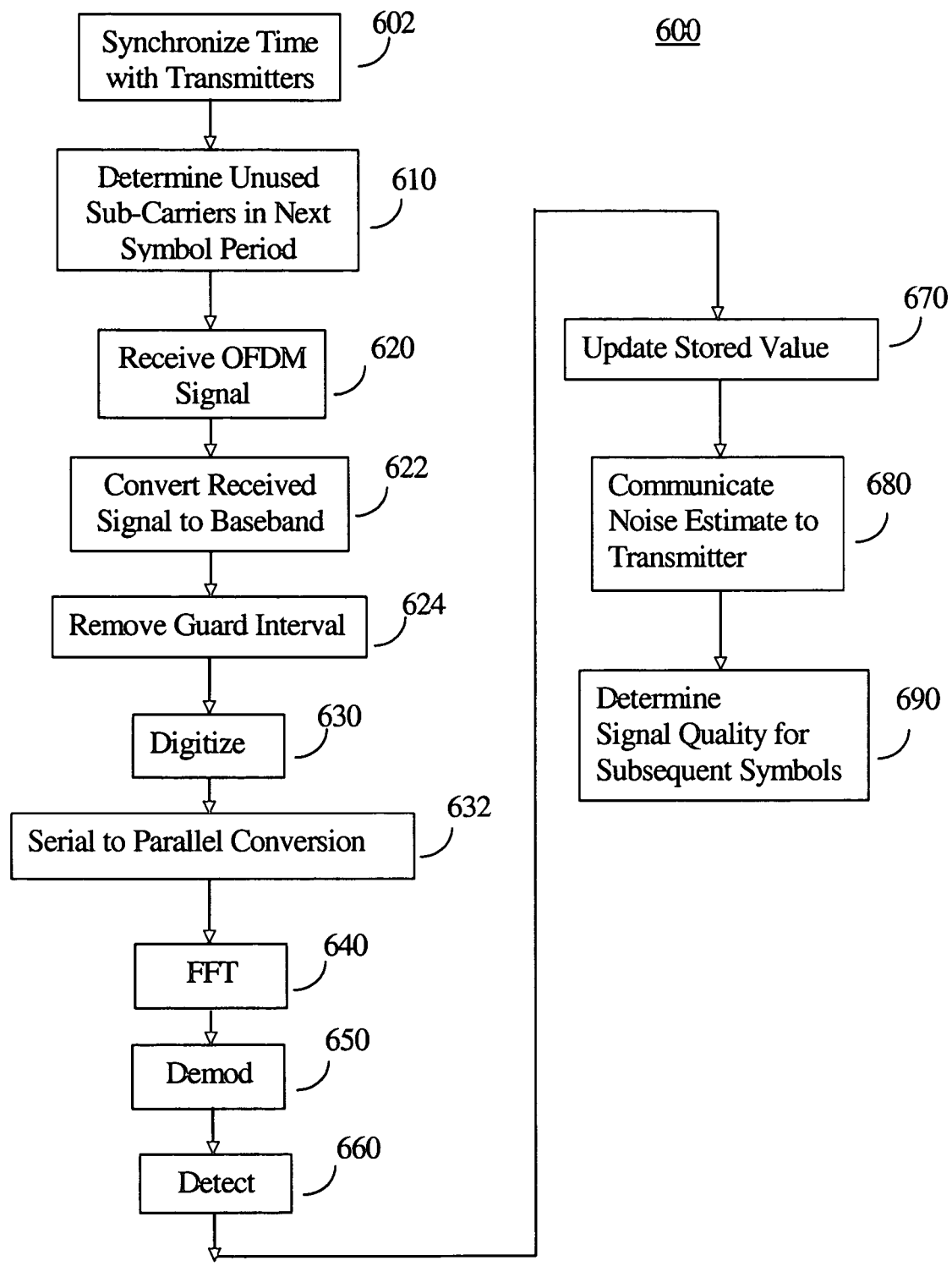
FIG. 6 is a flowchart of a method of determining noise and interference in an OFDM system.

FIG. 6 is a flowchart of a method 600 of determining and updating noise and interference levels in OFDM sub-carrier bands. The method 600 may be implemented in a receiver in an OFDM system. The receiver can be, for example, the receiver in a terminal. Alternatively, or additionally, the receiver can be, for example, a receiver in a base station transceiver.

The method 600 begins at block 602 where the receiver synchronizes in time with the transmitter. The receiver may, for example, synchronize a time reference with a time reference in the transmitter. The receiver may need to synchronize with the transmitter for a variety of reasons unrelated to noise estimation. For example, the receiver may need to synchronize with the transmitter in order to determine which sub-carriers are allocated to its communication link during one or more symbol periods.

The receiver next proceeds to block 610 where the receiver determines the unused, or unassigned, sub-carriers in the next symbol period. The transmitter may send this information to the receiver in an overhead message. Thus, a message received by the receiver indicates which of the sub-carriers are unassigned in a given symbol period. Alternatively, the assignment of sub-carriers may be pseudo random and the receiver may have synchronized a locally generated pseudo random sequence with the transmitter in the previous synchronization step. In the alternative embodiment, the receiver determines the unassigned sub-carriers based on an internally generated sequence, such as the locally generated pseudo random sequence or an internally generated frequency hopping sequence.

The receiver proceeds to block 620 where the transmitted OFDM signals are received. The received symbols may include those assigned sub-carriers allocated to the communication link with the receiver as well as sub-carriers not allocated to the communication link with the receiver.

The receiver proceeds to block 622 where the receiver converts the received signals to a baseband OFDM signal. The received signals are typically wirelessly transmitted to the receiver as RF OFDM symbols using an RF link. The receiver typically converts the received signal to a baseband signal to facilitate signal processing.

After converting the received signal to a baseband signal, the receiver proceeds to block 624 where the guard intervals are removed from the received signals. As discussed earlier in the discussion of the OFDM transmitter, the guard intervals are inserted to provide multipath immunity.

After removal of the guard intervals, the receiver proceeds to block 630 where the signal is digitized in an ADC. After digitizing the signal, the receiver proceeds to block 632 where the signal is converted from a serial signal to a number of parallel signals. The number of parallel signals may be as high as, and is typically equal to, the number of sub-carriers in the OFDM system.

After the serial to parallel conversion, the receiver proceeds to block 640 where the receiver performs an FFT on the parallel data. The FFT transforms the time domain OFDM signals into modulated sub-carriers in the frequency domain.

The receiver proceeds to block 650 where at least some of the modulated sub-carriers output from the FFT are demodulated. The receiver typically demodulates the sub-carriers allocated to the communication link with the receiver and also demodulates the unassigned sub-carriers.

The receiver then proceeds to block 660 where the unassigned sub-carriers are detected to provide a noise and interference estimate. If the sub-carrier is a system wide unassigned sub-carrier, the detected output represents an estimate of the noise floor for that sub-carrier band.

The receiver then proceeds to block 670 and updates the noise plus interference and noise floor estimates stored in memory. As discussed earlier, the receiver may store a predetermined number of most recently determined noise plus interference estimates and perform an average of the estimates. Similarly, the receiver may determine an average of a predetermined number of recently determined noise floor estimates.

The receiver proceeds to block 680 where the noise estimate is communicated to a transmitter. For example, if the receiver is a terminal receiver, the terminal receiver may communicate the noise estimate to a transmitter in a base station transceiver. The terminal receiver may first communicate the noise estimate to an associated terminal transmitter. The terminal transmitter may then transmit the noise estimate to the base station receiver. The base station receiver, in turn communicates the noise estimate to the base station transmitter. The base station transmitter may use the noise estimate to adjust the power level transmitted by the transmitter at the sub-carrier corresponding to the noise estimate.

The base station receiver may similarly communicate the received noise estimate to a terminal transmitter by first transmitting the noise estimate, using the base station transmitter, to the terminal receiver.

At block 690, the receiver determines a signal quality of subsequently received symbols based in part on the noise estimate determined using the unassigned sub-carrier. For example, the receiver estimates the noise plus interference of an unassigned sub-carrier. At the next symbol period, the receiver may receive a symbol over the same, previously unassigned, sub-carrier. The receiver is then able to determine a signal quality, such as C/I or SINR, based in part on the previously determined noise estimate. Similarly, where the receiver determines a noise floor estimate, the receiver is able to determine a SNR for subsequent symbols received on the same sub-carrier.

Because the number and position of unassigned sub-carriers typically vary randomly, or pseudo randomly, the receiver is able to periodically update the estimates of noise plus interference and noise floor for each of the sub-carrier frequency bands in the OFDM system. A receiver is thus able to generate and update estimates of noise plus interference and noise floor that can be communicated to transmitter stages in an effort to minimize CCI.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method of estimating noise in an Orthogonal Frequency Division Multiplexing (OFDM) system, the method comprising:
   receiving OFDM symbols in a wireless cellular communication system, the OFDM symbols corresponding to a symbol period;
   determining an idle sub-carrier frequency band during the symbol period, wherein the idle sub-carrier frequency band includes only noise and interference;
   determining a power, during the symbol period, in a frequency band corresponding to the idle sub-carrier frequency band;
   storing a value of the power of the idle sub-carrier frequency band in a memory; and
   computing a weighted average of the power of the idle sub-carrier frequency band with previously stored values to generate a noise estimate, wherein weights for the weighted average are based on ages of the previously stored values.

2. A non-transitory computer-readable medium embodying a program of instructions executable by a processor to perform a method of estimating noise in an Orthogonal Frequency Division Multiplexing (OFDM) system, the method comprising:
   receiving OFDM Symbols in a wireless cellular communication system, the OFDM symbols corresponding to a symbol period;
   determining an idle sub-carrier frequency band during the symbol period, wherein the idle sub-carrier frequency band includes only noise and interference;
   determining a power, during the symbol period, in the idle sub-carrier frequency band;
   storing a value of the power of the idle sub-carrier frequency band in a memory; and
   computing a weighted average of the power of the idle sub-carrier frequency band with previously stored values to generate a noise estimate, wherein weights for the weighted average are based on ages of the previously stored values.

3. A method of estimating noise in an Orthogonal Frequency Division Multiplexing (OFDM) system, the method comprising:
   receiving OFDM symbols;
   detecting a received power in an idle sub-carrier frequency band, wherein the idle sub-carrier frequency band includes only noise and interference; and
   computing a weighted average of the received power with at least one previously stored received power measurement for the idle sub-carrier frequency band, wherein a weight for the weighted average is based on an age of the at least one previously stored received power measurement.

4. The method of claim 1, further comprising determining the idle sub-carrier frequency band based in part on a received message.

5. The method of claim 1, further comprising determining the idle sub-carrier frequency band based in part on an internally generated sequence.

6. The method of claim 1, wherein receiving OFDM symbols comprises wirelessly receiving, from a base station transmitter, RF OFDM symbols.

7. The method of claim 1, wherein receiving OFDM symbols comprises:
converting wirelessly received RF OFDM symbols to baseband OFDM symbols;
removing a guard interval from the baseband OFDM symbols; and
transforming, using a Fast Fourier Transform (FFT), time domain OFDM baseband signals to modulated sub-carriers.

8. The method of claim 1, wherein detecting the received power comprises determining one of a magnitude, an amplitude, or a squared magnitude in the idle sub-carrier frequency band.

9. The method of claim 1, wherein detecting the received power comprises determining a sum of a square of a quadrature component with a square of an in-phase component.

10. The method of claim 1, further comprising:
determining if the idle sub-carrier frequency band comprises a system wide idle sub-carrier frequency band;
storing the detected received power as a noise plus interference estimate if the idle sub-carrier frequency band does not comprise the system wide idle sub-carrier frequency band; and
storing the detected received power as a noise floor estimate if the idle sub-carrier frequency band comprises the system wide idle sub-carrier frequency band.

11. The method of claim 10, further comprising synchronizing a time reference with a transmitter transmitting the OFDM symbols.

12. The method of claim 1, further comprising:
communicating a noise estimate to a transmitter, wherein the noise estimate comprises the weighted average.

13. The method of claim 12, wherein communicating the noise estimate to the transmitter comprises transmitting the noise estimate from a terminal transmitter to a base transceiver station.

14. The method of claim 1, further comprising, prior to detecting the received power, demodulating an idle sub-carrier corresponding to the idle sub-carrier frequency band.

15. An apparatus for estimating noise in an Orthogonal Frequency Division Multiplexing (OFDM) system, the apparatus comprising:
a wireless receiver configured to wirelessly receive OFDM symbols corresponding to an OFDM symbol period;
a detector configured to detect a received power level received by the wireless receiver during the OFDM symbol period;
a processor coupled to the detector and configured to determine an idle sub-carrier frequency band during the OFDM symbol period wherein the idle sub-carrier frequency band includes only noise and interference, to determine a noise estimate based in part on a received power level in the idle sub-carrier frequency band, and to determine a weighted average noise estimate based in part on the noise estimate and a previously stored noise estimate, wherein a weight for the weighted average is based on an age of the previously stored noise estimate.

16. The apparatus of claim 15, further comprising a memory coupled to the processor, the processor storing the noise estimate in the memory.

17. The apparatus of claim 15, further comprising a memory coupled to the processor and storing a predetermined number of previously determined noise estimates corresponding to the idle sub-carrier frequency band, the processor determining an average noise estimate based in part on the noise estimate and the previously determined noise estimates.

18. The apparatus of claim 15, wherein the wireless receiver comprises:
an RF receiver portion configured to wirelessly receive RF OFDM symbols and convert the RF OFDM symbols to the OFDM symbols;
a Fast Fourier Transform (FFT) module configured to receive the OFDM symbols from the RF receiver portion and transform the OFDM symbols to modulated subcarriers; and
a demodulator coupled to the FFT module and configured to demodulate the modulated sub-carriers.

19. The apparatus of claim 18, wherein the detector detects the received power levels of an output of the demodulator.

20. The apparatus of claim 15, wherein the detector detects the received power level by determining one of a magnitude, an amplitude, or a squared magnitude received by the wireless receiver during the OFDM symbol period.

21. An apparatus for estimating noise in an Orthogonal Frequency Division Multiplexing (OFDM) system, the apparatus comprising:
means for wirelessly receiving OFDM symbols corresponding to an OFDM symbol period;
means for detecting a received power level received by the means for wirelessly receiving OFDM symbols during the OFDM symbol period;
processing means, coupled to the means for detecting, for determining an idle sub-carrier frequency band during the OFDM symbol period wherein the idle sub-carrier frequency band includes only noise and interference, for determining a noise estimate based in part on a received power level in the idle sub-carrier frequency band, and for determining a weighted average noise estimate based in part on the noise estimate and a previously stored noise estimate, wherein a weight for the weighted average is based on an age of the previously stored noise estimate.

22. The apparatus of claim 21, further comprising a memory coupled to the processing means, the processing means storing the noise estimate in the memory.

23. The apparatus of claim 21, further comprising a memory coupled to the processing means and storing a predetermined number of previously determined noise estimates corresponding to the idle sub-carrier frequency band, the processing means determining an average noise estimate based in part on the noise estimate and the previously determined noise estimates.

24. The apparatus of claim 21, wherein the means for wirelessly receiving OFDM symbols comprises:
RF receiving means for wirelessly receiving RF OFDM symbols and for converting the RF OFDM symbols to the OFDM symbols;
Fast Fourier Transform (FFT) means for receiving the OFDM symbols from the RF receiving means and for transforming the OFDM symbols to modulated sub-carriers; and
demodulating means, coupled to the FFT means, for demodulating the modulated sub-carriers.

25. The apparatus of claim 24, wherein the means for detecting detects the received power levels of an output of the demodulating means.

26. The apparatus of claim 21, wherein the means for detecting detects the received power level by determining one of a magnitude, an amplitude, or a squared magnitude received by the wireless receiver during the OFDM symbol period.

* * * * *